May 14, 1968  J. F. SPENNER  3,382,545
HOSE CLIP
Filed May 10, 1966
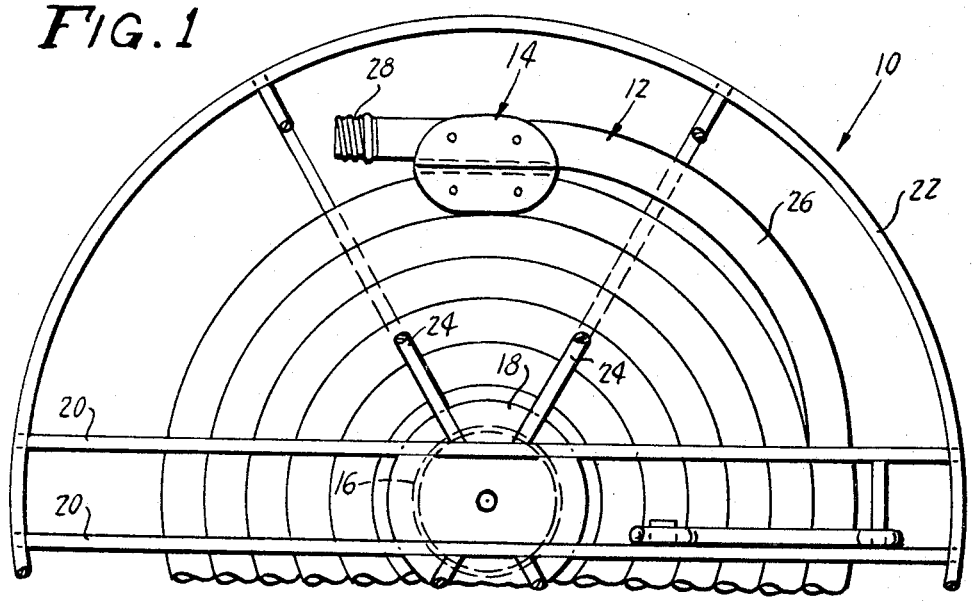
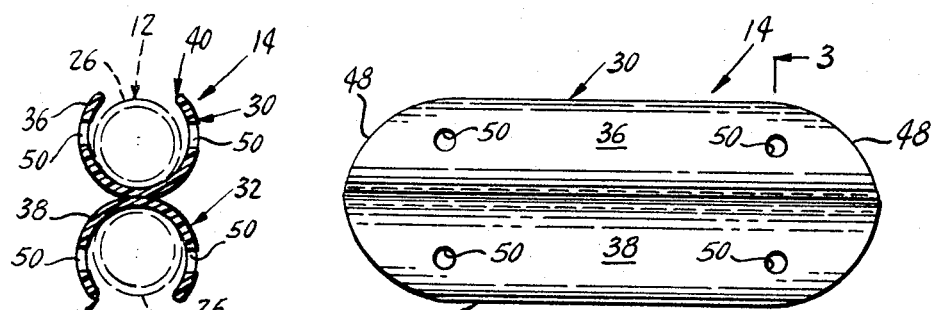
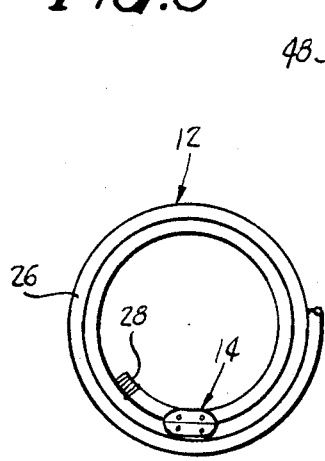
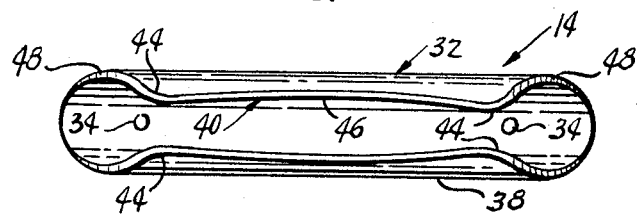
INVENTOR.
JOE F. SPENNER
BY *Kimmel, Crowell & Weaver*
ATTORNEYS.

United States Patent Office 3,382,545
Patented May 14, 1968

3,382,545
HOSE CLIP
Joe F. Spenner, Rte. 1, Box 277,
Stayton, Oreg. 97383
Filed May 10, 1966, Ser. No. 549,037
1 Claim. (Cl. 24—81)

ABSTRACT OF THE DISCLOSURE

A hose clip comprising two elongate generally cylindrical holding members provided with a longitudinal slot which is wider in the center portion than at the ends, the ends of which are arcuately convexly curved, said holding members being secured in back-to-back relation for receiving two adjacent portions of the hose is disclosed.

This invention relates to a clip for securing successive convolutions of a spiraled hose together to prevent inadvertent unwinding.

It is an object of the instant invention to provide a hose clip for expeditiously and temporarily securing successive convolutions of a coiled hose together to prevent inadvertent unwinding during storage and shipment.

Another object of the instant invention is to provide a hose clip which may be easily attached to successive convolutions of a coiled hose for securing the coil into a unitary structure for storage or shipment.

Still another object of the instant invention is to provide a unitary coiled hose temporarily held together by a clip fastened to successive convolutions of the spiraled member.

A more specific object of the instant invention is to provide a one-piece hose clip comprised of a pair of generally tubular members slotted to receive and hold the coiled hose.

Another more specific object of the instant invention is to provide a one-piece hose clip of the character described for holding successive convolutions of a spiraled hose together, the hose clip being so constructed and arranged as to be operable without the requirement of moving parts.

A further object of the instant invention is to provide an inexpensive clip for the described purposes having transversely beveled ends facilitating the insertion of a temporarily collapsible hose into the holding members.

A still further object of the instant invention is to provide a hose clip into which successive convolutions of the hose may be snapped, the clip being of sufficient length to hold the hose tenaciously.

Other objects and advantages of the instant invention reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is a partial side elevational view of a reel carrying a spirally wound hose, the free end of which is secured to the next preceding convolution by the hose clip of the instant invention;

FIGURE 2 is an enlarged top plan view of the hose clip of the instant invention;

FIGURE 3 is a transverse cross-sectional view of the hose clip of FIGURE 2 taken substantially along line 3—3 thereof as viewed in the direction indicated by the arrows;

FIGURE 4 is a side elevational view of the hose clip of FIGURES 2 and 3 illustrating the slot through which the hose is forced in order to secure the hose and clip together; and FIGURE 5 is a side elevational view of another mode by which the hose clip of the instant invention may be used.

Referring now to the drawing in detail, wherein like reference characters designate like elements throughout the several views thereof, a reel shown generally at 10 carries a spirally wound garden hose denominated generally at 12. As may be seen in FIGURES 1 and 3, hose clip 14 secures successive convolutions of hose 12 together to prevent inadvertent unwinding of the discharge end of hose 12.

Reel 10 is generally of conventional configuration and includes a central tubular support 16 carrying a pair of spaced apart flanges 18 acting to constrain the first convolution of hose 12. A pair of generally horizontal braces 20 connects each flange 18 to a circumferential band 22 while radial supports 24 act to rigidify band 22. Reel 10 therefore provides a pair of essentially parallel structures formed by braces 20, band 22 and supports 24 to retain hose 12 in the spiral configuration shown.

Hose 12 is a hollow, flexible member having a closed resilient wall 26, an externally threaded connection 28 on the outlet end thereof and an internally threaded connection (not shown) on the inlet end. Although clip 14 of the instant invention is illustrated in conjunction with a garden hose, it is to be understood that it may be used to prevent unraveling of any coiled, flexible, elongate member which is capable of transverse collapse as defined more fully hereinafter.

Referring now to FIGURES 2 through 4 inclusive, hose clip 14 includes a pair of holding members shown generally at 30, 32 secured together in back-to-back relation by a plurality of connecting means 34, such as rivets, glue or the like. As may be seen best in FIGURE 3, holding members 30, 32 include a wall 36, 38, generally tubular in shape, by which is meant a hollow conduit of circular, oval or polygonal configuration.

Each of walls 36, 38 forms a longitudinally extending slot shown generally at 40, 42 of substantially similar shape. Referring to FIGURE 4, it will be seen that slot 40 includes an area of minimum width 44 adjacent each end of wall 38 and an area of maximum width 46 intermediate the end of clip 14. When it is desired to insert hose 12 in clip 14, resilient wall 26 is collapsed and inserted through gap 44. After hose 12 resides interiorly of folding member 30, 32, the resilient nature of wall 26 will return to its original shape thereby precluding inadvertent movement of hose 12 through slot 40.

An important feature of the instant invention resides in the shape of slot 40 which allows an individual to collapse conveniently hose 12 into holding member 30. As may be seen from FIGURE 4, gap 46 is connected to each of minimum gaps 44 by a smooth arcuate wall. The individual first transversely collapses hose 12 to be partially received in either of gaps 44 and then uses the thumb to press the hose into the interior of holder 30 by moving the thumb longitudinally along slot 40. The longitudinally concave nature of slot 40 cams hose 12 into an oval shape such that the minimum diameter thereof passes through slot 40 into holder 30. Although it is preferred that the entire length of slot 40 be smaller than the nominal diameter of hose 12, it should be evident that maximum gap 46 may be slightly larger.

Another important feature of clip 14 is the provision of arcuate end 48 to facilitate the transverse collapse of hose 12 for insertion into minimum gap 44. As may be seen best in FIGURE 2, ends 48 are upwardly convex thus allowing an individual to place a portion of hose 12 thereagainst and press with the thumb. Ends 48 act to cam hose 12 into a substantially oval configuration such that the minimum diameter may be received in gap 44. The individual continues the insertion of hose 12 into clip 14 by pressing hose 12 and moving the thumb across the longitudinal extent of slot 40.

Another feature of importance in the construction of clip 14 is the ratio of its length to its internal diameter. In order to provide sufficient contact area between hose 12 and each of holding members 30, 32, the length of clip 14 should be at least twice the internal diameter thereof and preferably about five times the diameter. By providing clip 14 with such dimensions allows slot 40 to be utilized as an ingress and egress without the necessity of completely surrounding hose 12.

Each of tubular walls 36, 38 forms a plurality of transversely extending apertures 50 allowing holder 14 to be hung on a nail when not in use. Since clip 14 is preferably made of a relatively rigid material, such as sheet metal or hard plastic, the provision of apertures 50 also diminishes the weight of clip 14.

As shown in FIGURE 5, hose clip 14 may be utilized to secure the first and second coils of a hose together without the necessity of providing a reel or other structure for holding hose 12 in a predetermined shape for shipping and storage. It will be apparent that clip 14 will prevent the unrolling of the first coil of hose and likewise prevent entanglement of the first coil with the remaining coils.

It is now seen that there is herein provided an improved hose clip which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. A clip for securing successive convolutions of a flexible coiled hollow conduit together comprising:
   a first holding member of generally tubular configuration forming a longitudinal slot having a major portion slightly smaller in width than the minimum diameter of the hollow conduit for receiving one convolution of the hollow conduit upon partial temporary collapse thereof;
   a second holding member of generally tubular configuration forming a longitudinal slot having a major portion slightly smaller in width than the minimum diameter of the hollow conduit for receiving an adjacent convolution of the hollow conduit upon partial temporary collapse thereof, the ends of the holding members being smoothly, convexly, arcuately curved for the purpose of camming the hose into a shape receivable by the slot and the slots which are formed by the holding members having a minimum width adjacent each end thereof, a maximum width intermediate the ends of the hollow member and smoothly curved edges spanning the distance from the points of minimum width to the point of maximum width for facilitating the insertion of the hose into the respective holding member; and
   means securing the first holding member and the second holding member in back-to-back relation.

References Cited

UNITED STATES PATENTS

| 57,263 | 8/1866 | Winter | 24—137 |
| 198,929 | 1/1878 | Christey | 24—259 |
| 1,056,576 | 3/1913 | Olson. | |
| 1,950,979 | 3/1934 | Franke. | |
| 2,723,431 | 11/1955 | Renzo. | |

FOREIGN PATENTS

| 625,705 | 7/1949 | Great Britain. |
| 916,457 | 1/1963 | Great Britain. |

DONALD A. GRIFFIN, *Primary Examiner.*